(12) United States Patent
Okada et al.

(10) Patent No.: US 10,042,790 B2
(45) Date of Patent: Aug. 7, 2018

(54) COMPUTER AND METHOD WITH INTERRUPT VECTOR MANAGEMENT

(71) Applicant: Hitachi, Ltd., Tokyo (JP)

(72) Inventors: Kazuaki Okada, Tokyo (JP); Takao Totsuka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 9 days.

(21) Appl. No.: 15/121,420

(22) PCT Filed: Mar. 7, 2014

(86) PCT No.: PCT/JP2014/055879
§ 371 (c)(1),
(2) Date: Aug. 25, 2016

(87) PCT Pub. No.: WO2015/132942
PCT Pub. Date: Sep. 11, 2015

(65) Prior Publication Data
US 2016/0364349 A1 Dec. 15, 2016

(51) Int. Cl.
*G06F 13/24* (2006.01)
*G06F 9/48* (2006.01)
(Continued)

(52) U.S. Cl.
CPC .......... *G06F 13/24* (2013.01); *G06F 9/45545* (2013.01); *G06F 9/45558* (2013.01);
(Continued)

(58) Field of Classification Search
None
See application file for complete search history.

(56) References Cited

U.S. PATENT DOCUMENTS

| 6,412,035 B1* | 6/2002 | Webber | G06F 13/24 710/261 |
| 2006/0101181 A1* | 5/2006 | Post | G06F 9/45537 710/266 |

(Continued)

FOREIGN PATENT DOCUMENTS

JP  2010-250453 A  11/2010

OTHER PUBLICATIONS

International Search Report of PCT/JP2014/055879 dated Apr. 8, 2014.

Primary Examiner — Henry Tsai
Assistant Examiner — Aurangzeb Hassan
(74) Attorney, Agent, or Firm — Mattingly & Malur, PC

(57) ABSTRACT

A computer, on which operating systems run, the computer comprising a virtualization function module configured to manage virtual computers. A operating system is configured to run on each of the virtual computers. The virtualization function module includes an interrupt controller. The interrupt controller is configured to hold vector information for managing host-side interrupt vectors, and interrupt vector allocation information for managing allocation of the host-side interrupt vectors to the guest-side interrupt vectors that are set by the operating systems. The virtualization function module is configured to analyze a state of allocation of the host-side interrupt vectors to the guest-side interrupt vectors, and change the allocation of the host-side interrupt vectors to the guest-side interrupt vectors based on a result of the analysis.

7 Claims, 10 Drawing Sheets

(51) Int. Cl.
   *G06F 9/50*         (2006.01)
   *G06F 9/455*       (2018.01)
   *G06F 13/26*       (2006.01)

(52) U.S. Cl.
   CPC .......... *G06F 9/4812* (2013.01); *G06F 9/5077* (2013.01); *G06F 13/26* (2013.01); *G06F 2009/45579* (2013.01)

(56) References Cited

U.S. PATENT DOCUMENTS

| | | | | |
|---|---|---|---|---|
| 2010/0191889 | A1* | 7/2010 | Serebrin | G06F 9/4812 710/269 |
| 2010/0223611 | A1* | 9/2010 | Mahalingam | G06F 9/45537 718/1 |
| 2010/0262741 | A1* | 10/2010 | Hayakawa | G06F 13/24 710/263 |
| 2011/0072426 | A1* | 3/2011 | Huang | G06F 9/544 718/1 |
| 2011/0179416 | A1* | 7/2011 | Patale | G06F 9/5011 718/1 |
| 2011/0320664 | A1* | 12/2011 | Belmar | G06F 9/4812 710/269 |

* cited by examiner

INTERRUPT VECTOR ALLOCATION INFORMATION

| HOST-SIDE INTERRUPT VECTOR | GUEST-SIDE INTERRUPT VECTOR | GUEST OS | DEVICE NAME |
|---|---|---|---|
| VECTOR 01 | VECTOR 11 | FIRST GUEST OS | FIRST I/O DEVICE |
| VECTOR 01 | VECTOR 13 | FIRST GUEST OS | FIRST I/O DEVICE |
| VECTOR 01 | VECTOR 13 | FIRST GUEST OS | FIRST I/O DEVICE |
| VECTOR 02 | VECTOR 21 | SECOND GUEST OS | SECOND I/O DEVICE |
| VECTOR 02 | VECTOR 21 | SECOND GUEST OS | SECOND I/O DEVICE |
| VECTOR 03 | VECTOR 22 | SECOND GUEST OS | SECOND I/O DEVICE |
| VECTOR 03 | VECTOR 22 | SECOND GUEST OS | SECOND I/O DEVICE |
| VECTOR 04 | VECTOR 14 | FIRST GUEST OS | THIRD I/O DEVICE |
| VECTOR 05 | VECTOR 15 | FIRST GUEST OS | THIRD I/O DEVICE |
| VECTOR 05 | VECTOR 16 | FIRST GUEST OS | THIRD I/O DEVICE |
| VECTOR 05 | VECTOR 16 | FIRST GUEST OS | THIRD I/O DEVICE |

FIG. 4

STATISTIC INFORMATION OF FIRST VECTOR GROUP

| ID | GUEST-SIDE INTERRUPT VECTOR | HOST-SIDE INTERRUPT VECTOR | VECTOR TYPE | DEVICE NAME | STATISTIC SCORE |
|---|---|---|---|---|---|
| N0.01 | VECTOR 11 | VECTOR 01 | SHARED | FIRST I/O DEVICE | 450 |
| No.02 | VECTOR 13 | VECTOR 01 | SHARED | FIRST I/O DEVICE | 120 |
| No.03 | VECTOR 21 | VECTOR 02 | UNIQUE | SECOND I/O DEVICE | 80 |
| No.04 | VECTOR 22 | VECTOR 03 | UNIQUE | SECOND I/O DEVICE | 250 |

*FIG. 5A*

STATISTIC INFORMATION OF SECOND VECTOR GROUP

| ID | GUEST-SIDE INTERRUPT VECTOR | HOST-SIDE INTERRUPT VECTOR | VECTOR TYPE | DEVICE NAME | STATISTIC SCORE |
|---|---|---|---|---|---|
| N0.05 | VECTOR 14 | VECTOR 04 | UNIQUE | THIRD I/O DEVICE | 100 |
| No.06 | VECTOR 15 | VECTOR 05 | SHARED | THIRD I/O DEVICE | 150 |
| No.07 | VECTOR 16 | VECTOR 05 | SHARED | THIRD I/O DEVICE | 400 |

*FIG. 5B*

INTERRUPT VECTOR ALLOCATION INFORMATION

| HOST-SIDE INTERRUPT VECTOR | GUEST-SIDE INTERRUPT VECTOR | GUEST OS | DEVICE NAME |
|---|---|---|---|
| VECTOR 02 | VECTOR 11 | FIRST GUEST OS | FIRST I/O DEVICE |
| VECTOR 01 | VECTOR 13 | FIRST GUEST OS | FIRST I/O DEVICE |
| VECTOR 01 | VECTOR 13 | FIRST GUEST OS | FIRST I/O DEVICE |
| VECTOR 01 | VECTOR 21 | SECOND GUEST OS | SECOND I/O DEVICE |
| VECTOR 01 | VECTOR 21 | SECOND GUEST OS | SECOND I/O DEVICE |
| VECTOR 03 | VECTOR 22 | SECOND GUEST OS | SECOND I/O DEVICE |
| VECTOR 03 | VECTOR 22 | SECOND GUEST OS | SECOND I/O DEVICE |
| VECTOR 04 | VECTOR 14 | FIRST GUEST OS | THIRD I/O DEVICE |
| VECTOR 05 | VECTOR 15 | FIRST GUEST OS | THIRD I/O DEVICE |
| VECTOR 05 | VECTOR 16 | FIRST GUEST OS | THIRD I/O DEVICE |
| VECTOR 05 | VECTOR 16 | FIRST GUEST OS | THIRD I/O DEVICE |

*FIG. 9*

COMPUTER AND METHOD WITH INTERRUPT VECTOR MANAGEMENT

BACKGROUND OF THE INVENTION

This invention relates to interrupt processing of an I/O device in a computer system with a virtualization function.

In a computer system including physical computers each having a virtualization function module, e.g., a hypervisor, resources of one of the physical computers are divided to be provided to a plurality of virtual computers. A guest OS runs on each of the virtual computers. Each virtual computer is also allocated at least one of a plurality of I/O devices installed on the physical computer.

The I/O devices include a host bus adapter (HBA) and a network adapter, e.g., a network interface card (NIC). The guest OS running on each virtual computer can access a storage apparatus or other external apparatus coupled to a network, via an I/O device that is allocated to the virtual computer.

In a case where an I/O device in a general computer system notifies interrupt caused by a failure in the I/O device or other factors, an OS that controls the I/O device executes interrupt processing that corresponds to the notified interrupt.

SUMMARY OF THE INVENTION

In a computer system that has a virtualization function module, the virtualization function module notifies interrupt to a guest OS running on a virtual computer to which an I/O device that is suffering a failure is allocated. The guest OS executes interrupt processing of the I/O device. For example, the virtualization function module notifies the guest OS of interrupt indicating a failure in its I/O device due to the suspension of operation of the I/O device or the like (see, for example, JP 2010-250453 A).

The virtualization function module allocates an interrupt vector (host-side interrupt vector) for each interrupt cause to I/O devices. This enables the I/O devices to send to the virtualization function module an interrupt notification that includes a host-side interrupt vector. Each guest OS running on a virtual computer also allocates an interrupt vector (guest-side interrupt vector) to an I/O device that is allocated to the virtual computer.

In a case where an interrupt notification that includes a host-side interrupt vector is received from an I/O device, the virtualization function module converts the host-side interrupt vector into a guest-side interrupt vector managed by a relevant guest OS, and sends an interrupt notification that includes the guest-side interrupt vector to the guest OS.

The guest OS that receives the interrupt notification from the virtualization function module can identify the I/O device that has notified the interrupt and a type of interrupt processing that corresponds to the notified interrupt based on the guest-side interrupt vector included in the notification.

The virtualization function module generally secures as many host-side interrupt vectors as the number of guest OSes, and allocates the secured interrupt vectors to I/O devices.

However, there is a limit in terms of hardware to interrupt vectors that are available for use by a CPU included in the physical computer. Interrupt vectors for all I/O devices installed in the physical computer need to be secured from vectors of the CPU, which means that, in a case where the physical computer has a very large number of I/O devices, a shortage of host-side interrupt vectors to be allocated to I/O devices occurs, whereas guest OSes have no trouble in setting guest-side interrupt vectors to I/O devices that are allocated to virtual computers.

As a countermeasure, the virtualization function module sets the same host-side interrupt vector to a plurality of guest-side interrupt vectors. In other words, a host-side interrupt vector is shared by a plurality of guest-side interrupt vectors. When the interrupt notification described above which includes a host-side interrupt vector is received in this case, the virtualization function module identifies the I/O device that has issued the notification and the interrupt cause by referring to an interrupt cause register of each I/O device. The virtualization function module notifies interrupt to a guest OS on a virtual computer to which the identified I/O device is allocated.

However, processing of accessing the interrupt cause register of an I/O device has a particularly large overhead compared to other processing procedures that are executed on the computer system. An increase of this access processing consequently lowers system performance.

A technology of minimizing overhead that is caused by processing of accessing the interrupt cause register of an I/O device is therefore needed in which the number of interrupt vectors that can be allocated by a CPU is kept track of and the allocation of interrupt vectors is optimized while the computer system is in operation.

The present invention can be appreciated by the description which follows in conjunction with the following figures, wherein: a computer, on which a plurality of operating systems run, the computer comprising, as physical resources: a processor, a volatile memory coupled to the processor, a non-volatile memory coupled to the processor, and at least one I/O device coupled to the processor. The computer comprises a virtualization function module configured to generate at least one virtual computer with use of the physical resources, and to manage the at least one virtual computer. One of the plurality of operating systems is configured to run on each of the at least one virtual computer. The one of the plurality of operating systems is configured to hold first vector information for managing guest-side interrupt vectors that are set in order for a virtual I/O device to notify interrupt. The virtual I/O device is allocated to one of the at least one virtual computer on which the one of the plurality of operating systems runs. The virtualization function module includes an interrupt controller configured to execute processing for dealing with an interrupt notification from the at least one I/O device. The interrupt controller is configured to hold: second vector information for managing host-side interrupt vectors that are set in order for the at least one I/O device included in the physical resources to notify interrupt; and interrupt vector allocation information for managing allocation of the host-side interrupt vectors to the guest-side interrupt vectors. The guest-side interrupt vectors include unique interrupt vectors and shared interrupt vectors, each of the unique interrupt vectors being one of the guest-side interrupt vectors that is allocated one of the host-side interrupt vectors, the shared interrupt vectors being a plurality of guest-side interrupt vectors that share one of the host-side interrupt vectors. The interrupt controller is configured to: identify a guest-side interrupt vector to which a host-side interrupt vector is allocated, based on the interrupt vector allocation information in a case where an interrupt notification including the host-side interrupt vectors is received; send an interrupt notification including the identified guest-side interrupt vector to one of the plurality of operating systems, based on the second vector information and the interrupt vector allocation information in a case where the identified guest-side interrupt vector is one of the unique interrupt vectors; and identify the guest-side interrupt vector and one of the plurality of operating systems that is an interrupt destination by accessing the I/O device to which the host-side interrupt vector included in the interrupt notification is allocated, based on the second vector information and the interrupt vector allocation information in a case where the identified guest-side interrupt vector is one of the shared interrupt vectors, and send an interrupt notification including the identified guest-side interrupt vector to the identified one of the plurality of operating systems. And the interrupt controller is configured to: analyze a state of allocation of the host-side interrupt vectors to the guest-side interrupt vectors; and change the allocation of the host-side interrupt vectors to the guest-side interrupt vectors based on a result of the analysis.

According to one aspect of this invention, the virtualization function module is capable of dynamically changing allocation between a shared interrupt vector and a unique interrupt vector based on the result of analysis of the state of allocation of host-side interrupt vectors to guest-side interrupt vectors. A drop in performance due to access to an I/O device is accordingly minimized. In addition, optimum allocation suited to the state of allocation of host-side interrupt vectors to guest-side interrupt vectors is accomplished.

Problems, configurations, and effects other than described above will become apparent from a description of an embodiment below.

BRIEF DESCRIPTION OF THE DRAWINGS

The present invention can be appreciated by the description which follows in conjunction with the following figures, wherein:

FIG. 4 is an explanatory diagram for showing an example of interrupt vector allocation information according to the first embodiment of this invention;

FIG. 5A and FIG. 5B are each an explanatory diagram for showing an example of statistic information according to the first embodiment of this invention;

FIG. 9 is an explanatory diagram for illustrating the interrupt vector allocation information according to the first embodiment of this invention.

DETAILED DESCRIPTION OF THE PREFERRED EMBODIMENTS

An embodiment of this invention is described below with reference to the accompanying drawings.

First Embodiment

Figure 1:
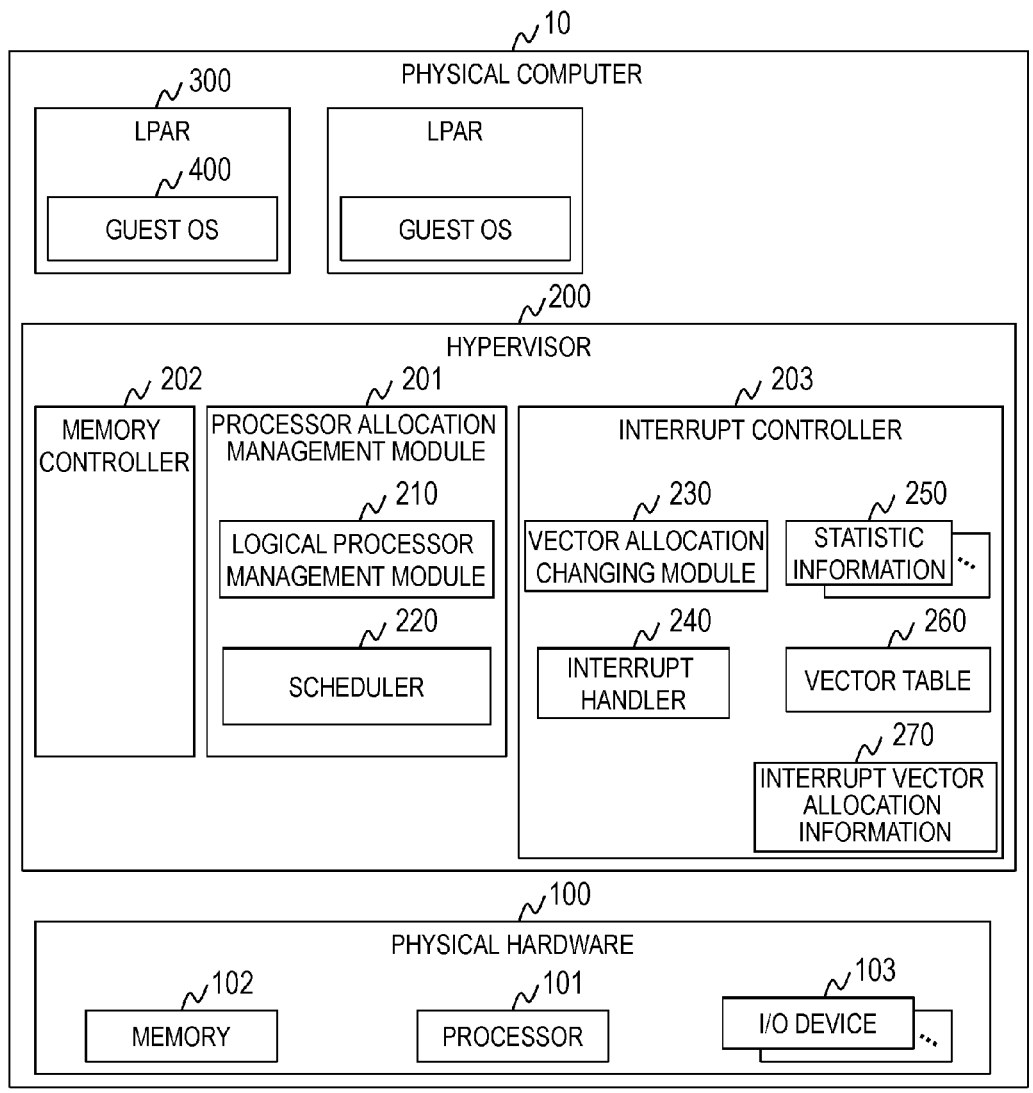
FIG. 1 is an explanatory diagram for illustrating an example of the hardware configuration and software configuration of a physical computer according to a first embodiment of this invention.

FIG. 1 is an explanatory diagram for illustrating an example of the hardware configuration and software configuration of a physical computer according to a first embodiment of this invention.

A physical computer 10 includes, as physical hardware 100, a processor 101, a memory 102, and a plurality of I/O devices 103. The physical hardware 100 may include other hardware components such as a hard disk drive (HDD) and a solid state drive (SSD).

The processor 101 executes programs stored in the memory 102. The processor 101 includes a plurality of CPU cores. The processor 101 executes the programs, thereby implementing a hypervisor 200 and other functions. When a description given below on processing has a program as the subject, it means that the program is executed by the processor 101.

The memory 102 stores programs executed by the processor 101 and information necessary to execute the programs. The memory 102 also includes work areas for the respective programs. The memory 102 of this embodiment stores, among others, a program for implementing the hypervisor 200 and a program for implementing guest OSes 400.

The I/O devices 103 are devices coupled to external apparatus to receive input of information from the outside and to output information to the outside. The I/O devices 103 can be, for example, NICs and HBAs. In this embodiment, one card serves as one I/O device 103. In a case where a single card includes a plurality of controllers, the hypervisor 200 can recognize a device that is managed by one controller as one I/O device 103.

When the physical computer 10 is booted up, the program for implementing the hypervisor 200 is stored in a part of the storage area of the memory 102, and is executed by the processor 101.

The hypervisor 200 generates virtual computers using the physical hardware 100, and manages the generated virtual computers. The hypervisor 200 in this embodiment generates LPARs 300 by logically partitioning the physical hardware 100, and runs the guest OSes 400 on the generated LPARs 300.

Interrupt vectors that are managed by the hypervisor 200 and interrupt vectors that are managed by the guest OSes 400 are described.

The hypervisor 200 allocates interrupt vectors to the I/O devices 103 of the physical hardware 100. The hypervisor 200 may use one interrupt vector to manage one interrupt cause, or may use one interrupt vector to manage a plurality of interrupt causes. Interrupt vectors that are managed by the hypervisor 200 are also referred to as "host-side interrupt vectors".

Each guest OS 400 allocates interrupt vectors to the I/O device 103 that is allocated to the relevant LPAR 300. The guest OS 400 may use one interrupt vector to manage one interrupt cause, or may use one interrupt vector to manage a plurality of interrupt causes. Interrupt vectors that are managed by the guest OSes 400 are also referred to as "guest-side interrupt vectors".

The hypervisor 200 includes a processor allocation management module 201, a memory controller 202, and an interrupt controller 203. The hypervisor 200 may include other function modules than the ones given above.

The processor allocation management module 201 manages the allocation of logical processors to the LPARs 300. The processor allocation management module 201 includes a logical processor management module 210 and a scheduler 220.

The logical processor management module 210 manages the allocation of logical processors to the LPARs 300. The scheduler 220 controls the allocation of logical processors to processing procedures that are executed by the guest OSes 400 running on the LPARs 300.

The memory controller 202 manages the allocation of logical memories to the LPARs 300. In this embodiment, the memory controller 202 allocates a part of the storage area of the memory 102 as logical memories to the LPARs. The memory controller 202 also controls memory access of the guest OSes 400 running on the LPARs 300.

The interrupt controller 203 controls processing for dealing with interrupt from the I/O devices 103 or from other components. The interrupt controller 203 also manages the allocation of host-side interrupt vectors to guest-side interrupt vectors. The interrupt controller 203 includes a vector allocation changing module 230, an interrupt handler 240, statistic information 250, a vector table 260, and interrupt vector allocation information 270.

The vector allocation changing module 230 changes the allocation of a host-side interrupt vector to a guest-side interrupt vector based on the statistic information 250. The interrupt handler 240 executes processing for dealing with interrupt that has occurred.

Statistic information of interrupt that has occurred is stored as the statistic information 250. In this embodiment, one piece of statistic information 250 is generated for each one of vector groups, which are described later. The statistic information 250 is described later with reference to FIG. 5A and FIG. 5B.

The vector table 260 holds a plurality of entries, in each of which a host-side interrupt vector that is allocated to the I/O devices 103 managed by the hypervisor is associated with an address at which the interrupt handler 240 that is associated with the host-side interrupt vector is read. The vector table 260 is a known vector table, and a detailed description thereof is omitted.

The interrupt vector allocation information 270 is information for managing the state of allocation of host-side interrupt vectors to guest-side interrupt vectors. The interrupt vector allocation information 270 is described later with reference to FIG. 4.

In a case where an interrupt notification that includes a host-side interrupt vector is received from one of the I/O devices 103, the hypervisor 200 converts the host-side interrupt vector into a guest-side interrupt vector based on the interrupt vector allocation information 270, and outputs an interrupt notification that includes the guest-side interrupt vector obtained by the conversion to the relevant guest OS 400. The guest OS 400 receives the interrupt notification from the hypervisor 200 and obtains the guest-side interrupt vector from the notification. The guest OS 400 refers to a vector table that is held in the guest OS 400, and calls up an interrupt handler that is associated with the obtained guest-side interrupt vector to execute interrupt processing.

Figure 2:
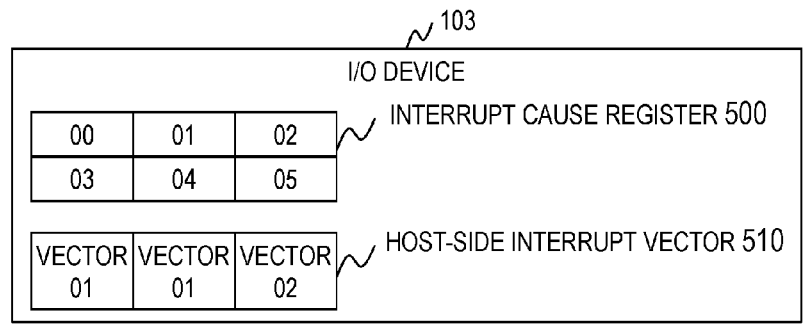
FIG. 2 is a block diagram for illustrating the configuration of I/O devices according to the first embodiment of this invention.

FIG. 2 is a block diagram for illustrating the configuration of the I/O devices 103 according to the first embodiment of this invention.

Each I/O device 103 includes an interrupt cause register 500. Each I/O device 103 is also allocated at least one host-side interrupt vector 510.

The interrupt cause register 500 is a register configured to hold values that indicate causes of interrupt. The host-side interrupt vector 510 is an interrupt vector used by the I/O device 103 to notify interrupt to the processor 101 (hypervisor 200). Two vectors are set in the example of FIG. 2. A "vector 01" is an interrupt vector used to notify an interrupt that has two interrupt causes, and a "vector 02" is a vector used to notify an interrupt that has one interrupt cause.

The I/O devices 103 include the following three types.

The I/O device 103 of one type is an I/O device in which access to the interrupt cause register 500 by the hypervisor 200 does not delete a value stored in the interrupt cause register 500. In the following description, this type of I/O device 103 is also referred to as "Type 1 I/O device".

The I/O device 103 of another type is an I/O device in which access to the interrupt cause register 500 by the hypervisor 200 deletes a value stored in the interrupt cause register 500. In the following description, this type of I/O device 103 is also referred to as "Type 2 I/O device".

In a case where a host-side interrupt vector is shared by a plurality of guest-side interrupt vectors with the use of a plurality of Type 2 I/O devices, the hypervisor 200 needs to access the interrupt cause registers 500 of the Type 2 I/O devices in order to identify an interrupt cause. Identifying an interrupt cause is difficult in a case where a plurality of interrupts occur concurrently because a value stored in the interrupt cause register 500 of a Type 2 I/O device is deleted when accessed by the hypervisor 200. For that reason, the hypervisor 200 in this embodiment performs control so as to prevent the sharing of a host-side interrupt vector that involves a plurality of Type 2 I/O devices. Host-side interrupt vector sharing is described later with reference to FIG. 3.

The I/O device 103 of still another type is an I/O device 103 whose interrupt cause register 500 cannot be accessed because the specifications of the I/O device 103 are not made public or for other reasons. In the following description, this type of I/O device 103 is also referred to as "Type 3 I/O device".

With a Type 3 I/O device, the hypervisor 200 cannot access the interrupt cause register 500 and is consequently unable to identify an interrupt cause. The sharing of a host-side interrupt vector using Type 3 I/O devices therefore does not happen.

Figure 3:
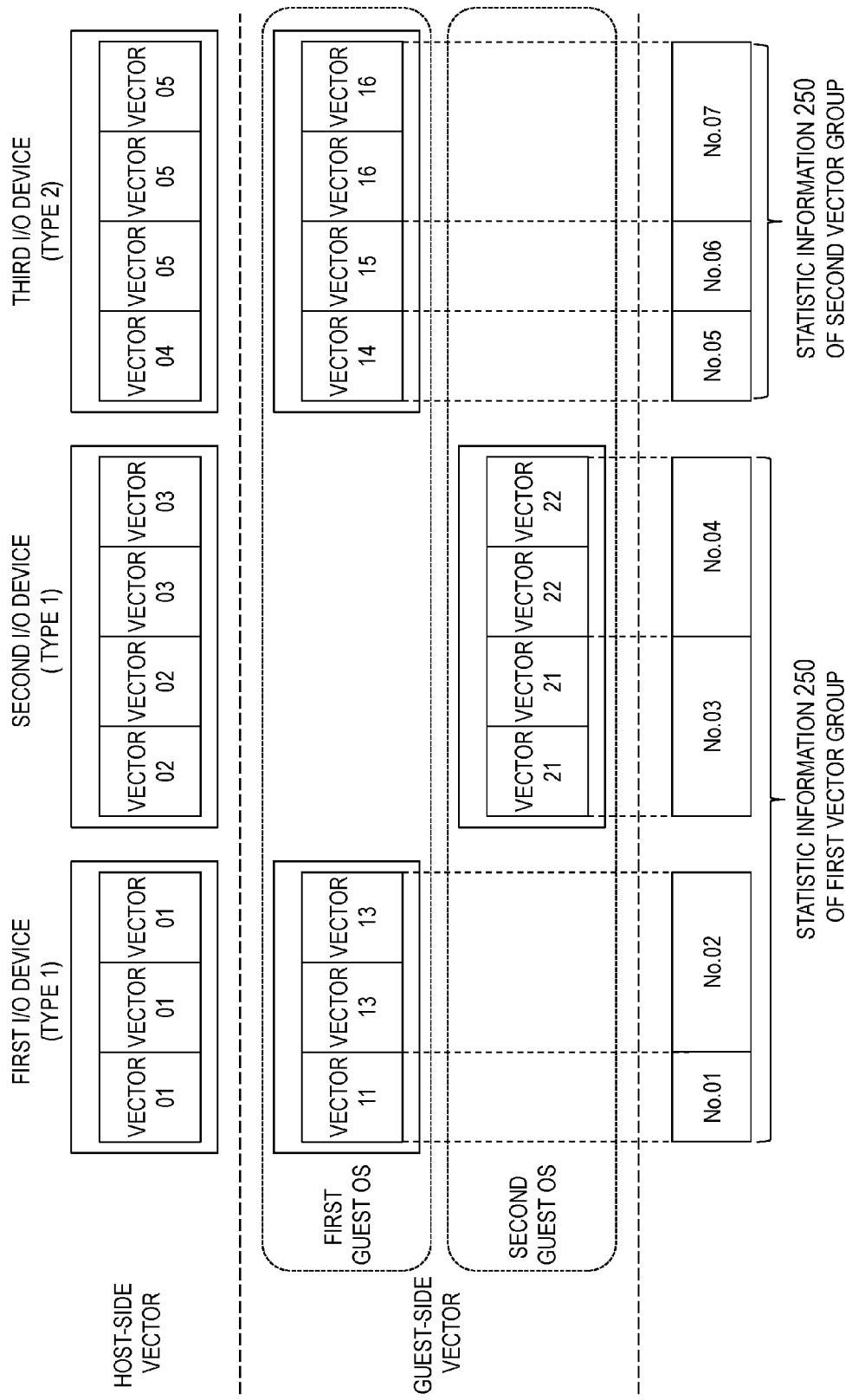
FIG. 3 is an explanatory diagram for illustrating state of allocation of host-side interrupt vectors to guest-side interrupt vectors in the first embodiment of this invention.

FIG. 3 is an explanatory diagram for illustrating the state of allocation of host-side interrupt vectors to guest-side interrupt vectors in the first embodiment of this invention.

The physical hardware 100 in FIG. 3 includes a first I/O device 103, a second I/O device 103, and a third I/O device 103. The first I/O device 103 and the second I/O device 103 are Type 1 I/O devices, and the third I/O device 103 is a Type 2 I/O device.

In FIG. 3, two LPARs 300 are generated in the physical computer 10, a first guest OS 400 is run on one of the two LPARs 300, and a second guest OS 400 is run on the other LPAR 300. The LPAR 300 on which the first guest OS 400 is run is allocated the first I/O device 103 and the third I/O device 103, and the LPAR 300 on which the second guest OS 400 is run is allocated the second I/O device 103.

The hypervisor 200 allocates at least one interrupt vector (host-side interrupt vector) to each I/O device 103 included in the physical hardware 100. In a case where a given interrupt cause occurs in one of the I/O devices 103, the I/O device 103 uses an interrupt vector (host-side interrupt vector) that is associated with this interrupt cause to notify the hypervisor 200 of the interrupt.

In FIG. 3, the hypervisor 200 allocates a "vector 01" as a host-side interrupt vector to the first I/O device 103. The hypervisor 200 uses the "vector 01" to manage three interrupt causes. The hypervisor 200 allocates a "vector 02" and a "vector 03" as host-side interrupt vectors to the second I/O device 103. The hypervisor 200 uses the "vector 02" to manage two interrupt causes, and uses the "vector 03" to manage two interrupt causes. The hypervisor 200 allocates a "vector 04" and a "vector 05" as host-side interrupt vectors to the third I/O device 103. The hypervisor 200 uses the "vector 04" to manage one interrupt cause, and uses the "vector 05" to manage three interrupt causes.

Each guest OS 400 allocates interrupt vectors (guest-side interrupt vectors) to the I/O device 103 that is allocated to the relevant LPAR 300.

The hypervisor 200 allocates one host-side interrupt vector to one guest-side interrupt vector. When one host-side interrupt vector is allocated to one guest-side interrupt vector, the guest-side interrupt vector is referred to as "unique interrupt vector". When one host-side interrupt vector is allocated to a plurality of guest-side interrupt vectors, on the other hand, the guest-side interrupt vectors are referred to as "shared interrupt vectors".

In a case where one host-side interrupt vector is used to manage a plurality of interrupt causes, guest-side interrupt vectors are handled as follows. That is, in a case where the number of interrupt causes that are managed with the use of one guest-side interrupt vector is the same as the number of interrupt causes that are managed with the use of a host-side interrupt vector allocated to the guest-side interrupt vector, the guest-side interrupt vector is treated as a unique interrupt vector. Otherwise, guest-side interrupt vectors are treated as shared interrupt vectors.

Of the guest-side interrupt vectors in FIG. 3, a "vector 14", a "vector 21", and a "vector 22" are unique interrupt vectors, and a "vector 11", a vector 13", a "vector 15", and a "vector 16" are shared interrupt vectors.

The hypervisor 200 of this embodiment updates the statistic information 250 in a case where interrupt occurs, and executes interrupt processing that corresponds to the interrupt that has occurred. The hypervisor 200 of this embodiment also optimizes the allocation of host-side interrupt vectors to guest-side interrupt vectors based on the statistic information 250.

The hypervisor 200 generates a first vector group, which is made up of a plurality of Type 1 I/O devices, and a second vector group, which is made up of one Type 2 I/O device. The hypervisor 200 changes the allocation of a host-side interrupt vector to a guest-side interrupt vector within a vector group as described later. The hypervisor 200 manages statistics information on a vector group-by-vector group basis for that reason.

In a case where there are a plurality of first vector groups and a plurality of second vector groups, the hypervisor 200 assigns an identifier to each vector group and manages the identifiers of the vector group in association with the type of the vector group. The type of a vector group is information that indicates whether the vector group is the first vector group or the second vector group.

The hypervisor 200 in FIG. 3 generates the statistic information 250 of a first vector group made up of the first I/O device 103 and the second I/O device 103, and the statistic information 250 of a second vector group made up of the third I/O device 103. The hypervisor 200 updates one of those pieces of statistic information 250 when interrupt occurs.

In a case where a single card includes a plurality of controllers, vector groups are handled as follows. That is, in a case where a device managed by one of the controllers in the card is recognized as a Type 1 I/O device, the allocation of guest-side interrupt vectors can be changed throughout a plurality of controllers. A group made up of a plurality of controllers can therefore be treated as a first vector group. In a case where a device managed by one of the controllers in the card is recognized as a Type 2 I/O device, on the other hand, the allocation of guest-side interrupt vectors can be changed within the controller alone. A group made up of one controller can therefore be treated as a second vector group. In other words, the hypervisor 200 groups devices that the hypervisor 200 itself manages as the I/O device 103 by type, and manages the allocation of guest-side interrupt vectors for each group separately.

The statistic information 250 and the interrupt vector allocation information 270 are described next.

FIG. 4 is an explanatory diagram for showing an example of the interrupt vector allocation information 270 according to the first embodiment of this invention.

The interrupt vector allocation information 270 includes in each entry a host-side interrupt vector 601, a guest-side interrupt vector 602, a guest OS 603, and a device name 604.

The value of a host-side interrupt vector is stored as the host-side interrupt vector 601. The value of a guest-side interrupt vector is stored as the guest-side interrupt vector 602. The identifier of a guest OS is stored as the guest OS 603. The identifier of the I/O device 103 that is allocated to the guest OS 603 is stored as the device name 604.

FIG. 5A and FIG. 5B are each an explanatory diagram for showing an example of the statistic information 250 according to the first embodiment of this invention. FIG. 5A is for showing the statistic information 250 of the first vector group and FIG. 5B is for showing the statistic information 250 of the second vector group.

The statistic information 250 includes in each entry an ID 701, a guest-side interrupt vector 702, a host-side interrupt vector 703, a vector type 704, a device name 705, and a statistic score 706.

An identifier with which an entry in the statistic information is uniquely identified is stored as the ID 701. The value of a guest-side interrupt vector is stored as the guest-side interrupt vector 702. The value of a host-side interrupt vector that is allocated to the guest-side interrupt vector indicated by the guest-side interrupt vector 702 is stored as the host-side interrupt vector 703.

Information that indicates whether the guest-side interrupt vector indicated by the guest-side interrupt vector 702 is a unique interrupt vector or a shared interrupt vector is stored as the vector type 704. A value "unique" stored as the vector type 704 indicates that the guest-side interrupt vector in question is a unique interrupt vector. A value "shared" stored as the vector type 704 indicates that the guest-side interrupt vector in question is a shared interrupt vector.

The identifier of the I/O device 103 to which the host-side interrupt vector indicated by the host-side interrupt vector 703 is allocated is stored as the device name 705. The number of times interrupt that is associated with the guest-side interrupt vector 702 has occurred is stored as the statistic score 706. As shown in FIG. 5A, the hypervisor 200 in this embodiment manages statistic scores with a guest-side interrupt vector as the unit of processing.

A method of generating the statistic information 250 is described.

The hypervisor 200 identifies the types of the I/O devices 103 included in the physical hardware 100 to generate at least one vector group. The hypervisor 200 assigns an identifier to each vector group generated.

For example, in a case where the physical hardware 100 includes a plurality of Type 1 I/O devices, one first vector group made up of the plurality of Type 1 I/O devices is generated. In a case where the physical hardware 100 includes a plurality of Type 2 I/O devices, the hypervisor 200 generates a plurality of second vector groups each of which is made up of one Type 2 I/O device.

The hypervisor 200 selects one vector group out of the vector groups generated. The hypervisor 200 identifies all of the I/O devices 103 that make up the selected vector group. The hypervisor 200 further identifies host-side interrupt vectors that are allocated to the identified I/O devices 103 by referring to the vector table 260. The hypervisor 200 also refers to the interrupt vector allocation information 270 to identify guest-side interrupt vectors to which the host-side interrupt vectors are allocated.

The hypervisor 200 next generates one piece of empty statistic information 250 for the selected vector group.

The hypervisor 200 selects a guest-side interrupt vector to be processed out of the identified guest-side interrupt vectors, and adds one entry for the selected guest-side interrupt vector to the statistic information 250. The hypervisor 200 adds one entry for one guest-side interrupt vector (number) irrespective of whether or not one guest-side interrupt vector is used to manage a plurality of interrupt causes. In the added entry, the hypervisor 200 sets a given identifier to the ID 701 and sets "0" to the statistic score 706.

The hypervisor 200 sets the guest-side interrupt vector to the guest-side interrupt vector 702 of the added entry. The hypervisor 200 refers to the interrupt vector allocation information 270 to identify a host-side interrupt vector and the I/O device 103 that are associated with the guest-side interrupt vector, sets the identified host-side interrupt vector to the host-side interrupt vector 703 of the added entry, and sets the identifier of the identified I/O device to the device name 705 of the entry.

The hypervisor 200 determines whether the guest-side interrupt vector is a unique interrupt vector or a shared interrupt vector by referring to the interrupt vector allocation information 270. In a case where the guest-side interrupt vector is a unique interrupt vector, the hypervisor 200 sets "unique" to the vector type 704 of the added entry. In a case where the guest-side interrupt vector is a shared interrupt vector, on the other hand, the hypervisor 200 sets "shared" to the vector type 704 of the added entry.

The hypervisor 200 executes the processing described above for every guest-side interrupt vector. Executing the same processing for other vector groups as well generates the statistic information 250. This concludes the description on a method of generating the statistic information 250.

Figure 6:
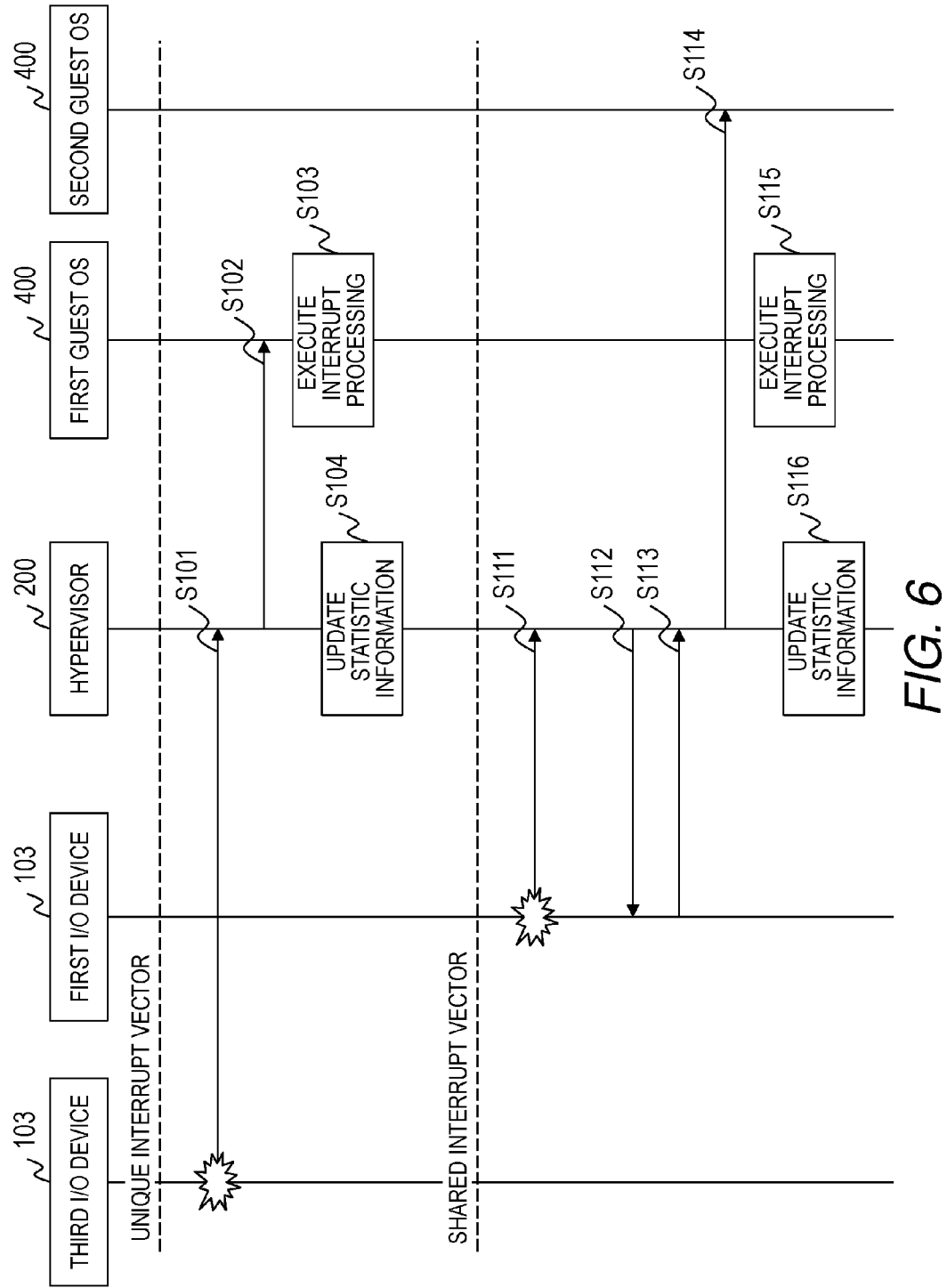
FIG. 6 is a sequence diagram for illustrating the flow of processing that is executed by a hypervisor and guest OSes according to the first embodiment of this invention in a case where interrupt occurs.

FIG. 6 is a sequence diagram for illustrating the flow of processing, that is executed by the hypervisor 200 and the guest OSes 400 according to the first embodiment of this invention in a case where interrupt occurs.

The flow of processing that is executed in a case where the guest-side interrupt vector in question is a unique interrupt vector is described first. The description given here takes as an example the "vector 04" of FIG. 3, which is a host-side interrupt vector allocated to the third I/O device 103.

In a case where an interrupt cause that is associated with the "vector 04" occurs, the third I/O device 103 sends an interrupt notification that includes the "vector 04" to the hypervisor 200 (Step S101).

The hypervisor 200 refers to the interrupt vector allocation information 270 to send to the first guest OS 400 an interrupt notification that includes a guest-side interrupt vector to which the host-side interrupt vector included in the interrupt notification is allocated (Step S102). Specifically, the following processing is executed.

The hypervisor 200 receives the interrupt notification and refers to the vector table 260 to identify the I/O device 103 that has notified the interrupt. The hypervisor 200 also refers to the interrupt vector allocation information 270 to identify a guest-side interrupt vector to which the "vector 04" included in the interrupt notification is allocated. The hypervisor 200 determines whether or not the identified guest-side interrupt vector is a unique interrupt vector.

The "vector 04" is allocated only to the "vector 14", which is a guest-side interrupt vector managed by the first guest OS 400, and therefore the hypervisor 200 determines here that the "vector 14" is a unique interrupt vector. This informs the hypervisor 200 of the fact that accessing the interrupt cause register 500 in order to identify an interrupt cause is unnecessary.

The hypervisor 200 sends an interrupt notification that includes the "vector 14" to the first guest OS 400 based on the interrupt vector allocation information 270. Step S102 has now been described.

The first guest OS 400 receives the interrupt notification that includes the "vector 14" from the hypervisor, and executes interrupt processing that corresponds to the "vector 14" (Step S103).

Specifically, the first guest OS 400 refers to a vector table that is managed by the first guest OS 400, and calls up an interrupt handler that is associated with the "vector 14".

Meanwhile, the hypervisor 200, after notifying the first guest OS 400 of the interrupt, updates the statistic information 250 of the second vector group (Step S104). Specifically, the following processing is executed.

The hypervisor 200 identifies a vector group to which the third I/O device 103 identified in Step S102 belongs. The hypervisor 200 here identifies the second vector group as a vector group to which the third I/O device 103 belongs.

The hypervisor 200 searches the statistic information 250 of the second vector group for an entry in which the guest-side interrupt vector 702 is "vector 14". The hypervisor 200 adds "1" to the value of the statistic score 706 in the found entry. Step S104 has now been described.

The flow of processing that is executed in a case where the guest-side interrupt vector in question is a shared interrupt vector is described next. The description given here takes as an example the "vector 01" of FIG. 3, which is a host-side interrupt vector allocated to the first I/O device 103.

In a case where an interrupt cause that is associated with the "vector 01" occurs, the first I/O device 103 sends an interrupt notification that includes the "vector 01" to the hypervisor 200 (Step S111).

The hypervisor 200 accesses the interrupt cause register 500 of the first I/O device 103 (Step S112), and obtains a value stored in the interrupt cause register 500 (Step S113). Specifically, the following processing is executed.

The hypervisor 200 receives the interrupt notification and refers to the vector table 260 to identify the I/O device 103 that has notified the interrupt. The hypervisor 200 also refers to the interrupt vector allocation information 270 to identify a guest-side interrupt vector to which the "vector 01"

included in the interrupt notification is allocated. The hypervisor 200 determines whether or not the identified guest-side interrupt vector is a unique interrupt vector.

The hypervisor 200 here identifies the "vector 11" and the "vector 13", which are guest-side interrupt vectors managed by the first guest OS 400, as guest-side interrupt vectors to which the "vector 01" is allocated, based on the interrupt vector allocation information 270. The hypervisor 200 further identifies the "vector 11" and the "vector 13" as shared interrupt vectors.

The hypervisor 200 refers to the interrupt vector allocation information 270 to identify the first I/O device 103 as the I/O device where the interrupt has occurred. The hypervisor 200 refers to the interrupt vector allocation information 270 to identify the first I/O device 103 as an I/O device that is allocated to the second guest OS 400. The hypervisor 200 obtains a value from the interrupt cause register 500 of the first I/O device 103. It is assumed here that the hypervisor 200 identifies the interrupt that has occurred as interrupt to the "vector 11". Step S112 and Step S113 have now been described.

The hypervisor 200 identifies the guest-side interrupt vector based on the interrupt vector allocation information 270, and sends an interrupt notification that includes the identified guest-side interrupt vector to the second guest OS 400 (Step S114). The hypervisor 200 here sends an interrupt notification that includes the "vector 11" to the second guest OS 400.

The second guest OS 400 receives the interrupt notification that includes the "vector 11" from the hypervisor 200, and executes interrupt processing that corresponds to the "vector 11" (Step S115).

Specifically, the second guest OS 400 refers to a vector table that is managed by the second guest OS 400, and calls up an interrupt handler that is associated with the "vector 11".

Meanwhile, the hypervisor 200, after notifying the second guest OS 400 of the interrupt, updates the statistic information 250 of the first vector group (Step S116). Specifically, the following processing is executed.

The hypervisor 200 identifies a vector group to which the first I/O device 103 identified in Step S112 belongs. The hypervisor 200 here identifies the first vector group as a vector group to which the first I/O device 103 belongs.

The hypervisor 200 searches the statistic information 250 of the first vector group for an entry in which the guest-side interrupt vector 702 is "vector 11". The hypervisor 200 adds "1" to the value of the statistic score 706 in the found entry. Step S116 has now been described.

As described with reference to FIG. 5, the hypervisor 200 does not access the interrupt cause register 500 of the I/O device 103 in a case where the guest-side interrupt vector is a unique interrupt vector. On the other hand, the hypervisor 200 accesses the interrupt cause register 500 of the I/O device 103 in a case where the guest-side interrupt vector is a shared interrupt vector. Step S112 and Step S113' are processing that has the largest overhead.

Figure 7A:
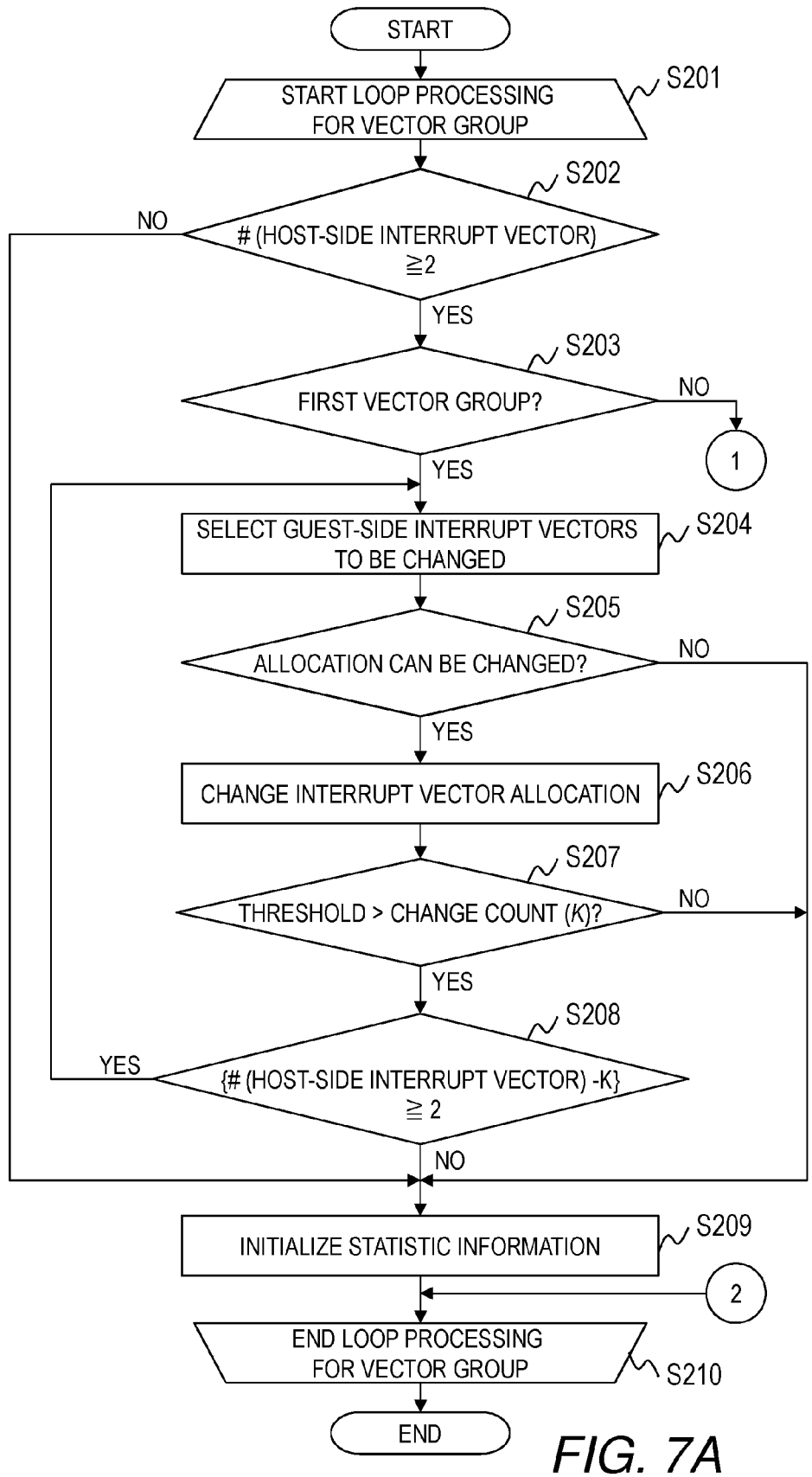
FIG. 7A and FIG. 7B are flow charts for illustrating interrupt vector allocation changing processing that is executed by the hypervisor according to the first embodiment of this invention.
Figure 7B:
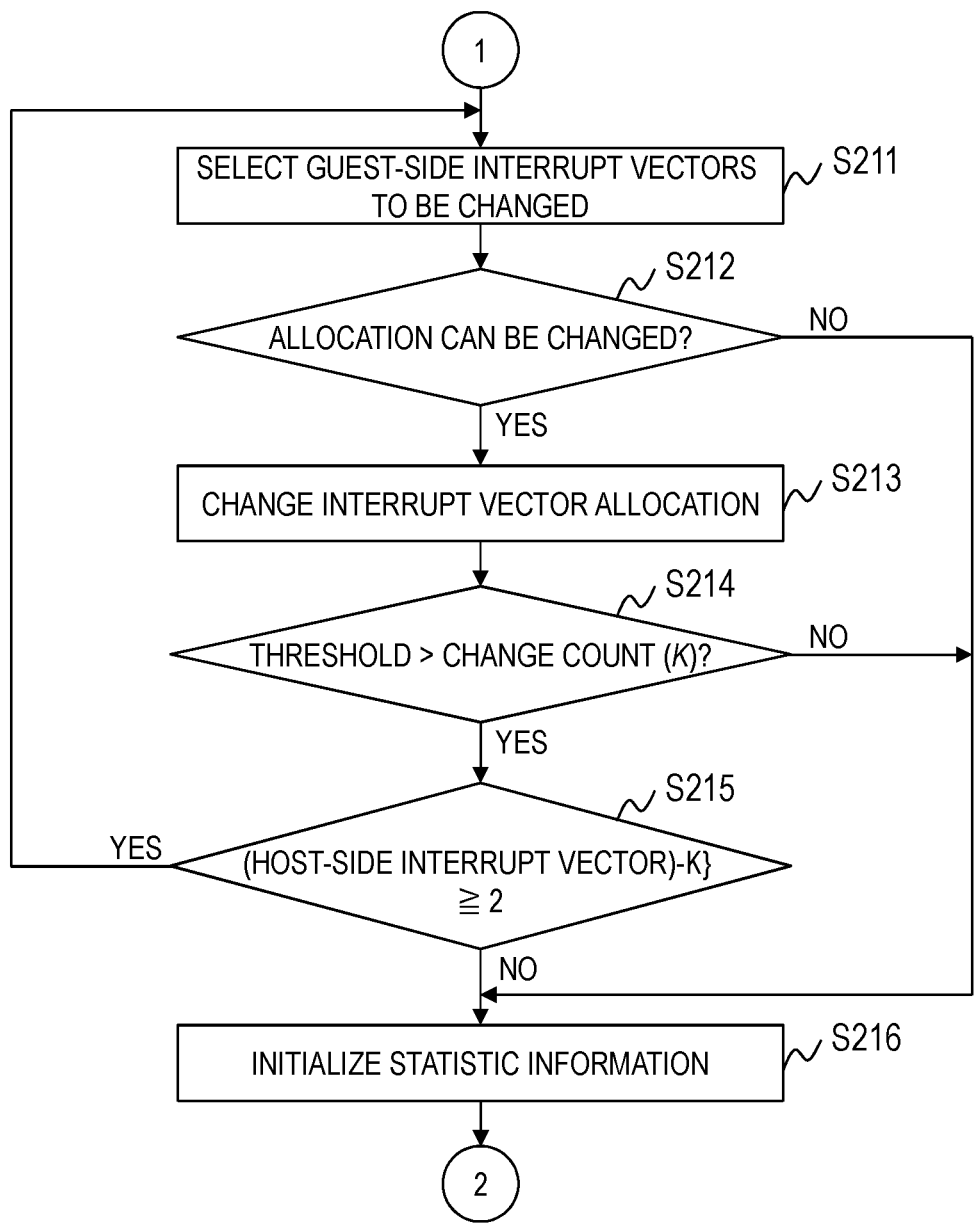

FIG. 7A and FIG. 7B are flow charts for illustrating interrupt vector allocation changing processing that is executed by the hypervisor 200 according to the first embodiment of this invention.

The vector allocation changing module 230 of the hypervisor 200 executes the interrupt vector allocation changing processing. A threshold indicating the number of times the processing is executed is set to the vector allocation changing module 230 in advance. Alternatively, the identifier of a vector group to be processed may be input.

The vector allocation changing module 230 starts the processing cyclically or in a case of receiving an instruction from a user. At the start of the processing, the vector allocation changing module 230 may determine whether or not interrupt vectors can be switched.

For example, the vector allocation changing module 230 determines whether or not every I/O device 103 included in the physical hardware 100 is a Type 3 I/O device. In a case where every I/O device 103 is a Type 3 I/O device, the vector allocation changing module 230 does not execute the interrupt vector allocation changing processing. This is because shared interrupt vectors cannot be set. The vector allocation changing module 230 also determines whether or not the number of host-side interrupt vectors that can be set in the physical computer 10 is "2" or more. In a case where the number of host-side interrupt vectors that can be set in the physical computer 10 is smaller than "2", the vector allocation changing module 230 does not execute the interrupt vector allocation changing processing. This is because shared interrupt vectors cannot be set.

The vector allocation changing module 230 starts loop processing for a vector group (Step S201). Specifically, the vector allocation changing module 230 selects a vector group to be processed out of the vector groups, and obtains the statistic information 250 of the selected vector group. In a case where a vector group to be processed is specified in advance, the vector allocation changing module 230 selects the specified vector group alone.

The vector allocation changing module 230 determines whether or not the number of host-side interrupt vectors set to the I/O device(s) 103 that are included in the selected vector group is "2" or more (Step S202).

Specifically, the vector allocation changing module 230 refers to the vector table 260 to calculate the number of host-side interrupt vectors set to the included I/O device(s) 103. The vector allocation changing module 230 determines whether or not the calculated number of host-side interrupt vectors is "2" or more.

In a case where it is determined that the number of host-side interrupt vectors set to the I/O device(s) 103 that are included in the selected vector group is smaller than "2", the vector allocation changing module 230 initializes the statistic information 250 (Step S209), and proceeds to Step S210. Specifically, the vector allocation changing module 230 sets the value of the statistic score 706 to "0".

In a case where it is determined that the number of host-side interrupt vectors set to the I/O device(s) 103 that are included in the selected vector group is "2" or more, the vector allocation changing module 230 determines whether or not the selected vector group is a first vector group (Step S203). Specifically, the vector allocation changing module 230 determines whether or not the selected vector group is a first vector group based on the type of the vector group.

In a case where it is determined that the selected vector group is a first vector group, the vector allocation changing module 230 selects a unique interrupt vector and a shared interrupt vector that are to be changed, based on the statistic information 250 of the selected vector group (Step S204).

Specifically, the vector allocation changing module 230 selects an entry that has the largest value as the statistic score 706 from entries in which "shared" is set to the vector type 704. The vector allocation changing module 230 also selects an entry that has the smallest value as the statistic score 706 from entries in which "unique" is set to the vector type 704.

The vector allocation changing module 230 determines whether or not the allocation can be switched between the unique interrupt vector and the shared interrupt vector (Step S205).

Specifically, the vector allocation changing module 230 determines whether or not the value of the statistic score 706 in the entry for the shared interrupt vector (SVecMax) is larger than the value of the statistic score 706 in the entry for the unique interrupt vector (UVecMin). In other words, whether Equation (1) is satisfied or not is determined. In a case where Equation (1) is satisfied, the vector allocation changing module 230 determines that the allocation can be switched between the unique interrupt vector and the shared interrupt vector.

[Equation 1]

$$(S\text{VecMax}) > (U\text{VecMin}) \quad (1)$$

In a case where it is determined that the allocation cannot be switched between the unique interrupt vector and the shared interrupt vector, the vector allocation changing module 230 initializes the statistic information 250 (Step S209), and proceeds to Step S210. Specifically, the vector allocation changing module 230 sets the value of the statistic score 706 to "0".

In a case where it is determined that the allocation can be switched between the unique interrupt vector and the shared interrupt vector, the vector allocation changing module 230 switches the interrupt vector allocation (Step S206). In other words, the vector allocation changing module 230 updates the interrupt vector allocation information 270.

Specifically, the vector allocation changing module 230 sets a host-side interrupt vector that has been allocated to the unique interrupt vector to the host-side interrupt vector 601 of the entry for the shared interrupt vector, and sets a host-side interrupt vector that has been allocated to the shared interrupt vector to the host-side interrupt vector 601 of the entry for the unique interrupt vector.

In a case of changing the allocation, the hypervisor 200 changes not only the allocation of host-side interrupt vectors to guest-side interrupt vectors but also the allocation of the host-side interrupt vectors to the I/O devices 103.

The vector allocation changing module 230 performs control so as to prevent the entry for the unique interrupt vector and the entry for the shared interrupt vector from being selected. The purpose is to avoid selecting a guest-side interrupt vector that has already undergone allocation change in a case where the same processing is executed repeatedly.

The vector allocation changing module 230 also changes the statistic information 250 as follows. That is, the vector allocation changing module 230 sets the host-side interrupt vector that has been allocated to the unique interrupt vector to the host-side interrupt vector 703 of the entry for the shared interrupt vector, and sets the host-side interrupt vector that has been allocated to the shared interrupt vector to the host-side interrupt vector 703 of the entry for the unique interrupt vector.

Through the processing described above, the host-side interrupt vector allocated to the shared interrupt vector is switched to the host-side interrupt vector allocated to the unique interrupt vector, and the host-side interrupt vector allocated to the unique interrupt vector is switched to the host-side interrupt vector allocated to the shared interrupt vector.

The vector allocation changing module 230 determines whether or not the number of times the allocation has been switched between the unique interrupt vector and the shared interrupt vector (a change count) is smaller than the threshold (Step S207).

In a case where it is determined that the change count is equal to or more than the threshold, the vector allocation changing module 230 initializes the statistic information 250 (Step S209), and proceeds to Step S210. Specifically, the vector allocation changing module 230 sets the value of the statistic score 706 to "0".

In a case where it is determined that the change count is smaller than the threshold, the vector allocation changing module 230 determines whether or not a number that is obtained by subtracting the change count from the number of the host-side interrupt vectors is "2" or more (Step S208).

In a case where it is determined that the number obtained by subtracting the change count from the number of the host-side interrupt vectors is "2" or more, the vector allocation changing module 230 returns to Step S204 to execute the same processing.

In a case where it is determined that the number obtained by subtracting the change count from the number of the host-side interrupt vectors is smaller than "2", the vector allocation changing module 230 initializes the statistic information 250 (Step S209), and proceeds to Step S210. Specifically, the vector allocation changing module 230 sets the value of the statistic score 706 to "0".

After initializing the statistic information 250, the vector allocation changing module 230 determines whether or not every vector group has been processed (Step S210).

In a case where it is determined that not all of the vector groups have been processed, the vector allocation changing module 230 returns to Step S201 to execute the same processing for a new vector group.

In a case where it is determined that every vector group has been processed, the vector allocation changing module 230 ends the interrupt vector allocation changing processing.

In a case where it is determined in Step S203 that the selected vector group is a second vector group, the vector allocation changing module 230 selects a unique interrupt vector and a shared interrupt vector that are to be changed, based on the statistic information 250 of the selected vector group (Step S211). Step S211 to Step S216 are the same as Step S204 to Step S209, and a description thereof is omitted.

The difference between the processing for a first vector group and the processing for a second vector group is that, in a case of the first vector group, the allocation of a guest-side interrupt vector to a host-side interrupt vector that is set to a plurality of Type 1 I/O devices is changed, whereas the allocation of a guest-side interrupt vector to a host-side interrupt vector that is set to one Type 2 I/O device is changed in a case of the second vector group.

Executing the interrupt vector allocation changing processing optimizes the state of allocation of host-side interrupt vectors to guest-side interrupt vectors. The overall overhead of the computer system is thus reduced.

Specific processing results of the interrupt vector allocation changing processing are described with reference to FIG. 8 and FIG. 9. The following description assumes that the vector group selected in Step S201 is the first vector group illustrated in FIG. 3, and that the threshold indicating the number of times the processing is executed is "1".

Figure 8:
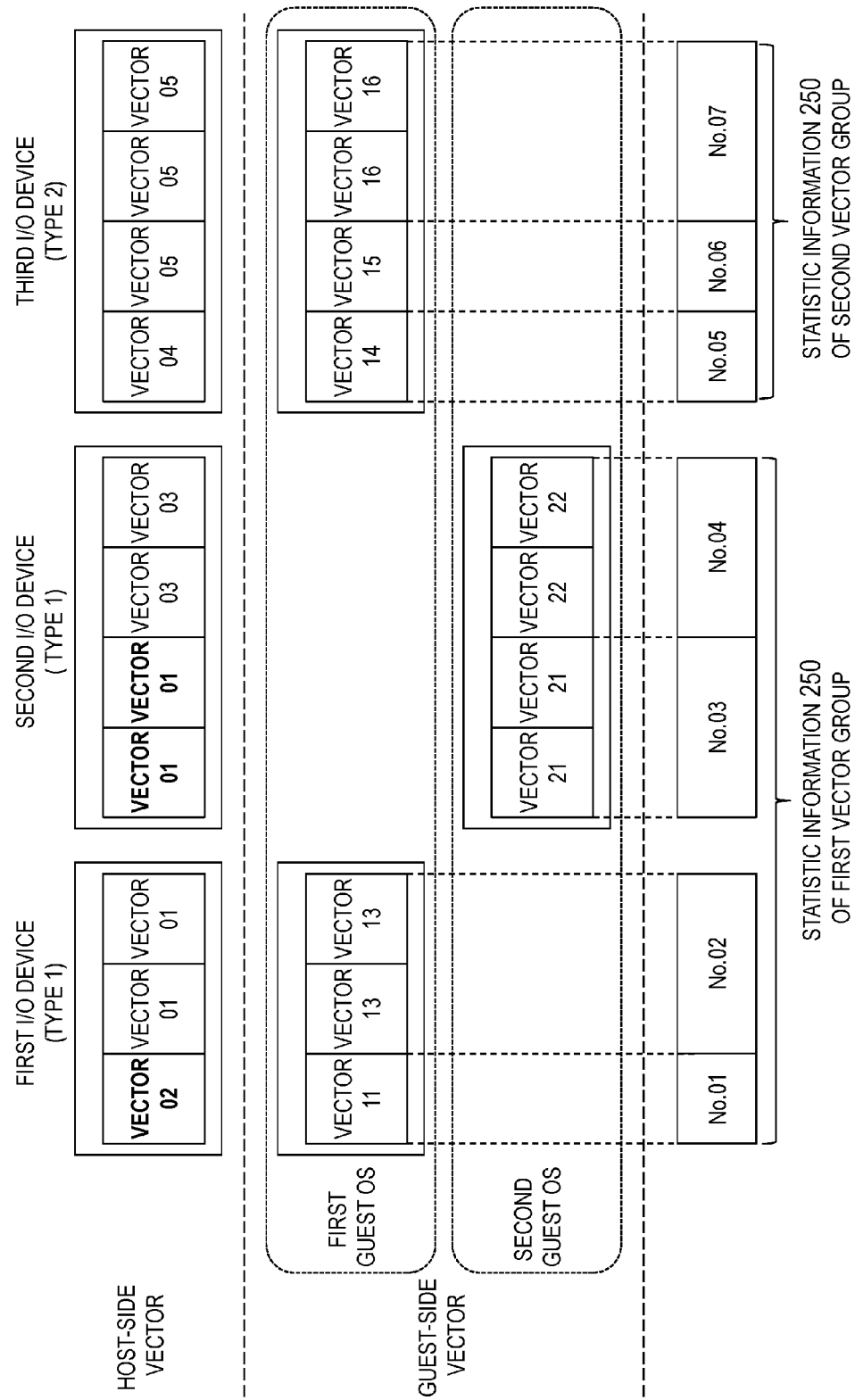
FIG. 8 is an explanatory diagram for illustrating the state of allocation of host-side interrupt vectors to guest-side interrupt vectors in the first embodiment of this invention.

FIG. 8 is an explanatory diagram for illustrating the state of allocation of host-side interrupt vectors to guest-side interrupt vectors in the first embodiment of this invention. FIG. 9 is an explanatory diagram for illustrating the interrupt vector allocation information 270 according to the first embodiment of this invention. FIG. 8 and FIG. 9 are for illustrating a state after the interrupt vector allocation changing processing is executed.

In Step S202, the number of host-side interrupt vectors is calculated as "3" because there are three host-side interrupt vectors, the "vector 01", the "vector 02", and the "vector 03". The vector allocation changing module 230 accordingly determines that the number of host-side interrupt vectors that are set to the I/O device(s) 103 included in the selected vector group is "2" or more.

In Step S204, the vector allocation changing module 230 selects the "vector 21" as the unique interrupt vector and the "vector 11" as the shared interrupt vector.

In Step S205, Expression (1) is satisfied because the value of the statistic score 706 in the entry for the "vector 11" is larger than the value of the statistic score 706 in the entry for the "vector 21". The vector allocation changing module 230 accordingly determines that the allocation can be switched between the unique interrupt vector and the shared interrupt vector.

In Step S206, the vector allocation changing module 230 changes the host-side interrupt vector 601 of the entry in which the guest-side interrupt vector 602 is "vector 11" from "vector 01" to "vector 02". The vector allocation changing module 230 also changes the host-side interrupt vector 601 of the entry in which the guest-side interrupt vector 602 is "vector 21" from "vector 02" to "vector 01". This changes the "vector 11", which has been a shared interrupt vector, into a unique interrupt vector and changes the "vector 21", which has been a unique interrupt vector, into a shared interrupt vector.

Second Embodiment

In the first embodiment, the allocation of a host-side interrupt vector to a guest-side interrupt vector is changed based on the statistic information 250.

In a second embodiment of this invention, the allocation of a host-side interrupt vector to a guest-side interrupt vector is changed based on the rank of an interrupt cause in the relevant guest OS 400.

The configurations of the physical computer 10 and the I/O devices 103 in the second embodiment are the same as those in the first embodiment, and descriptions thereof are omitted here. In the second embodiment, the interrupt controller 203 may or may not hold the statistic information 250. The interrupt vector allocation information 270 in the second embodiment is the same as that in the first embodiment, and a description thereof is omitted here. The second embodiment differs from the first embodiment in the specifics of interrupt vector allocation changing processing.

Figure 10:
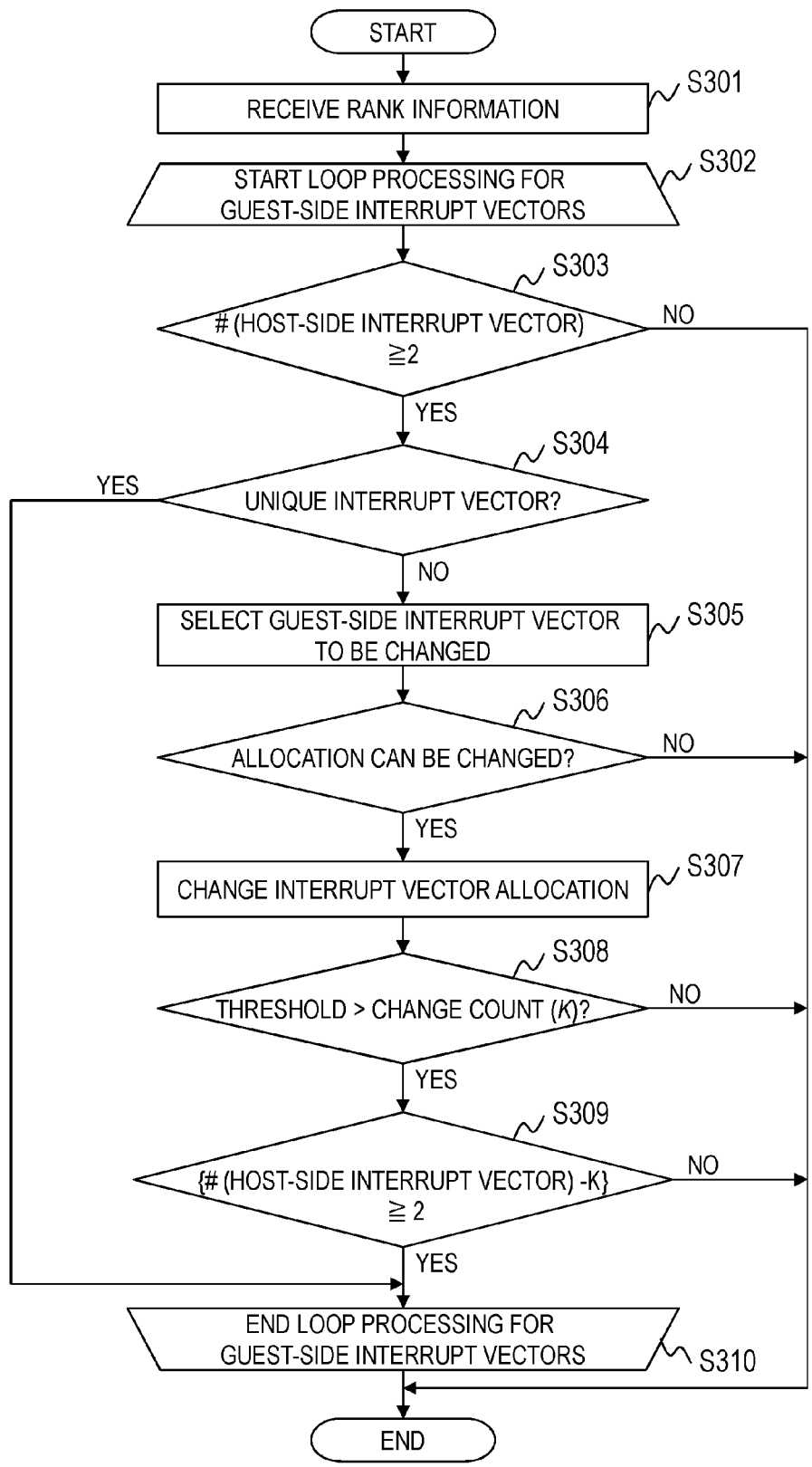
FIG. 10 is a flow chart for illustrating interrupt vector allocation changing processing that is executed by the hypervisor according to a second embodiment of this invention.

FIG. 10 is a flow chart for illustrating interrupt vector allocation changing processing that is executed by the hypervisor 200 according to the second embodiment of this invention.

The vector allocation changing module 230 starts the processing when guest-side interrupt vector rank information is received (Step S301). The guest-side interrupt vector rank information is information that indicates the priority order of interrupt causes in the relevant guest OS 400, and associates a guest-side interrupt vector with a place in priority order.

The vector allocation changing module 230 starts loop processing for guest-side interrupt vectors (Step S302). Specifically, the vector allocation changing module 230 selects a guest-side interrupt vector that has the highest place in priority order in the rank information.

The vector allocation changing module 230 determines whether or not the number of host-side interrupt vectors set to the I/O device(s) 103 corresponding to the selected guest-side interrupt vector is "2" or more (Step S303). Step S303 is the same as Step S202.

Specifically, the vector allocation changing module 230 refers to the interrupt vector allocation information 270 to identify the I/O device 103 to which a host-side interrupt vector allocated to the selected guest-side interrupt vector is set. The vector allocation changing module 230 refers to the vector table 260 to calculate the number of host-side interrupt vectors that are set to this I/O device 103.

In a case where it is determined that the number of host-side interrupt vectors that are set to the I/O device 103 is smaller than "2", the vector allocation changing module 230 ends the loop processing, and also ends the interrupt vector allocation changing processing.

In a case where it is determined that the number of host-side interrupt vectors that are set to the I/O device 103 is "2" or more, the vector allocation changing module 230 refers to the interrupt vector allocation information 270 to determine whether or not the selected guest-side interrupt vector is a unique interrupt vector (Step S304).

In a case where it is determined that the selected guest-side interrupt vector is a unique interrupt vector, the vector allocation changing module 230 proceeds to Step S310.

In a case where it is determined that the selected guest-side interrupt vector is not a unique interrupt vector, the vector allocation changing module 230 selects a unique interrupt vector to be changed, based on the rank information and the interrupt vector allocation information 270 (Step S305). Specifically, the following processing is executed.

The vector allocation changing module 230 searches the interrupt vector allocation information 270 for entries in which "unique" is set to the vector type 704, and obtains the value of the host-side interrupt vector 601 from each found entry.

The vector allocation changing module 230 searches the rank information for the place in priority order of the unique interrupt vector based on the obtained host-side interrupt vector. In a case where the search has yielded a plurality of unique interrupt vectors, the obtained places in priority order of the unique interrupt vectors are compared with one another. The vector allocation changing module 230 selects a unique interrupt vector that has the lowest place in priority order as the unique interrupt vector to be changed.

The vector allocation changing module 230 determines whether or not the allocation can be switched between the unique interrupt vector and the shared interrupt vector (Step S306).

Specifically, the vector allocation changing module 230 determines whether or not the place in priority order of the shared interrupt vector is higher than the place in priority order of the unique interrupt vector. In a case where the place in priority order of the shared interrupt vector is higher than the place in priority order of the unique interrupt vector, the vector allocation changing module 230 determines that the allocation can be switched between the unique interrupt vector and the shared interrupt vector.

In a case where it is determined that the allocation cannot be switched between the unique interrupt vector and the shared interrupt vector, the vector allocation changing module 230 ends the loop processing, and also ends the interrupt vector allocation changing processing.

In a case where it is determined that the allocation can be switched between the unique interrupt vector and the shared interrupt vector, the vector allocation changing module 230 updates the interrupt vector allocation information 270 (Step S307). Specifically, the vector allocation changing module 230 switches a host-side interrupt vector allocated to the shared interrupt vector and a host-side interrupt vector allocated to the unique interrupt vector with each other. Step S307 is the same as Step S206, and a description thereof is omitted.

The vector allocation changing module 230 determines whether or not the number of times the allocation has been switched between the unique interrupt vector and the shared interrupt vector (a change count) is smaller than the threshold (Step S308). Step S308 is the same as Step S207.

In a case where the change count is equal to or more than the threshold, the vector allocation changing module 230 ends the loop processing, and also ends the interrupt vector allocation changing processing.

In a case where it is determined that the change count is smaller than the threshold, the vector allocation changing module 230 determines whether or not a number that is obtained by subtracting the change count from the number of the host-side interrupt vectors is "2" or more (Step S309). Step S309 is the same as Step S208.

In a case where it is determined that the number obtained by subtracting the change count from the number of the host-side interrupt vectors is "2" or more, the vector allocation changing module 230 proceeds to Step S310.

In a case where it is determined that the number obtained by subtracting the change count from the number of the host-side interrupt vectors is smaller than "2", the vector allocation changing module 230 ends the loop processing, and also ends the interrupt vector allocation changing processing.

In Step S310, the vector allocation changing module 230 determines whether or not every guest-side interrupt vector has been processed (Step S310).

In a case where it is determined that not all of the guest-side interrupt vectors have been processed, the vector allocation changing module 230 returns to Step S302 to execute the same processing for a new guest-side interrupt vector.

In a case where it is determined that every guest-side interrupt vector has been processed, the vector allocation changing module 230 ends the interrupt vector allocation changing processing.

As described above, according to this invention, the hypervisor 200 analyzes the state of allocation of host-side interrupt vectors to guest-side interrupt vectors based on the statistic information 250 or the rank information, and changes the allocation of a host-side interrupt vector to a guest-side interrupt vector based on the result of the analysis.

In a case where interrupt vector allocation is changed based on the statistic information 250, a guest-side interrupt vector that is associated with an interrupt cause having high access frequency is preferentially set as a unique interrupt vector, and the overhead is thus reduced. In a case where interrupt vector allocation is changed based on the rank information, a guest-side interrupt vector that is high in priority order is set as a unique interrupt vector, and the overhead is thus reduced.

While the virtual computers in the description given above are LPARs, this invention is not limited thereto. The same configuration can be implemented also by an allocation method in which the same piece of physical hardware 100 is shared by a plurality of virtual computers. In this case, a different I/O device 103 is allocated to a virtual computer at a different time. Virtual computers that use this allocation method therefore differ from those of the embodiments in that the allocation of the I/O devices 103 needs to be managed as well.

The description of the embodiment is directed to the example of using the control by hardware, but it is also possible to realize a part thereof by software.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit.

The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A computer, on which a plurality of operating systems run, the computer comprising:
   a processor;
   a volatile memory coupled to the processor;
   a non-volatile memory coupled to the processor; and
   at least one I/O device coupled to the processor,
   wherein the processor, the volatile memory, the non-volatile memory, and the at least one I/O device are physical resources of the computer,
   wherein the processor is programmed to execute a virtualization function module configured to generate at least one virtual computer with the physical resources, and to manage the at least one virtual computer,
   wherein one of the plurality of operating systems is configured to run on each of the at least one virtual computer,
   wherein the one of the plurality of operating systems is configured to hold first vector information for managing a plurality of guest-side interrupt vectors that are set in order for the at least one I/O device to notify respective interrupts, and the at least one I/O device is allocated to one of the at least one virtual computer on which the one of the plurality of operating systems runs,
   wherein the virtualization function module includes an interrupt controller configured to hold:
   second vector information for managing a plurality of host-side interrupt vectors that are set in order for the at least one I/O device to notify respective interrupts,
   interrupt vector allocation information for managing allocation of the host-side interrupt vectors to the guest-side interrupt vectors, and statistic information for separately managing an interrupt occurrence count for each of the guest-side interrupt vectors, and wherein the guest-side interrupt vectors include unique interrupt vectors and shared interrupt vectors, each of the unique interrupt vectors being one of the guest-side interrupt vectors that is allocated one of the host-side interrupt vectors, each of the shared interrupt vectors being two or more of the guest-side interrupt vectors that share one of the host-side interrupt vectors, and wherein the interrupt controller is configured to:

identify a guest-side interrupt vector to which a host-side interrupt vector is allocated, based on the interrupt vector allocation information in a case where an interrupt notification including the host-side interrupt vectors is received;

send an interrupt notification including the identified guest-side interrupt vector to one of the plurality of operating systems, based on the second vector information and the interrupt vector allocation information, in a case where the identified guest-side interrupt vector is one of the unique interrupt vectors;

identify the guest-side interrupt vector and one of the plurality of operating systems that is an interrupt destination by accessing the respective I/O device to which the host-side interrupt vector included in the interrupt notification is allocated, based on the second vector information and the interrupt vector allocation information, in a case where the identified guest-side interrupt vector is one of the shared interrupt vectors, and send an interrupt notification including the identified guest-side interrupt vector to the identified one of the plurality of operating systems;

analyze a state of allocation of the host-side interrupt vectors to the guest-side interrupt vectors to select, based on the statistic information, a shared interrupt vector to be processed out of the shared interrupt vectors and a unique interrupt vector to be processed out of the unique interrupt vectors; and change the allocation of the host-side interrupt vectors to the guest-side interrupt vectors based on a result of the analysis including to change the selected shared interrupt vector into one of the unique interrupt vectors, and changing the selected unique interrupt vector into one of the shared interrupt vectors.

2. The computer according to claim 1, wherein the interrupt controller is further configured to:

search the plurality of shared interrupt vectors to find the shared interrupt vector that has a highest interrupt occurrence count;

search the plurality of unique interrupt vectors to find the unique interrupt vector that has a lowest interrupt occurrence count;

change a host-side interrupt vector that is allocated to the found shared interrupt vector to be allocated to the found selected unique interrupt vector; and change the host-side interrupt vector that is allocated to the found unique interrupt vector to the host-side interrupt vector that is allocated to the found shared interrupt vector.

3. The computer according to claim 1, wherein the physical resources comprise a plurality of I/O devices, wherein each of the plurality of I/O devices includes an interrupt cause register configured to store values that indicate causes of interrupts, wherein the plurality of I/O devices include:

a plurality of first I/O devices in which the interrupt cause register keeps holding the values in a case where the virtualization function module accesses the interrupt cause register; and a plurality of second I/O devices in which the values of the interrupt cause register are deleted in a case where the virtualization function module accesses the interrupt cause register, and wherein the interrupt controller is configured to:

generate a first vector group, which is made up of the plurality of first I/O devices;

generate the statistic information for managing the interrupt occurrence counts of the guest-side interrupt vectors to which the host-side interrupt vectors that are respectively set to the plurality of first I/O devices included in the first vector group are allocated;

generate a second vector group, which is made up of one of the plurality of second I/O devices;

generate the statistic information for managing the interrupt occurrence counts of the guest-side interrupt vectors to which the host-side interrupt vectors set to the one of the plurality of second I/O devices are allocated; and select a vector group to be processed in a case where allocation of the guest-side interrupt vectors is changed, and select the shared interrupt vector to be processed and the unique interrupt vector to be processed by referring to the statistic information that is associated with the selected vector group.

4. A computer on which a plurality of operating systems run, the computer comprising:

a processor;

a volatile memory coupled to the processor;

a non-volatile memory coupled to the processor; and at least one I/O device coupled to the processor, wherein the processor, the volatile memory, the non-volatile memory, and the at least one I/O device are physical resources of the computer, wherein the processor is programmed to execute a virtualization function module configured to generate at least one virtual computer with the physical resources, and to manage the at least one virtual computer, wherein one of the plurality of operating systems is configured to run on each of the at least one virtual computer, wherein the one of the plurality of operating systems is configured to hold first vector information for managing a plurality of guest-side interrupt vectors that are set in order for the at least one I/O device to notify respective interrupts, and the at least one I/O device is allocated to one of the at least one virtual computer on which the one of the plurality of operating systems runs, wherein the virtualization function module includes an interrupt controller configured to hold:

second vector information for managing a plurality of host-side interrupt vectors that are set in order for the at least one I/O device to notify respective interrupts, interrupt vector allocation information for managing allocation of the host-side interrupt vectors to the quest-side interrupt vectors, and rank information, which indicates a priority order of the guest-side interrupt vectors, wherein the guest-side interrupt vectors include unique interrupt vectors and shared interrupt vectors, each of the unique interrupt vectors being one of the guest-side interrupt vectors that is allocated one of the host-side interrupt vectors, each of the shared interrupt vectors being two or more of the quest-side interrupt vectors that share one of the host-side interrupt vectors, and wherein the interrupt controller is configured to:

identify a guest-side interrupt vector to which a host-side interrupt vector is allocated, based on the interrupt vector allocation information in a case where an interrupt notification including the host-side interrupt vectors is received;

send an interrupt notification including the identified guest-side interrupt vector to one of the plurality of operating systems, based on the second vector information and the interrupt vector allocation information, in a case where the identified guest-side interrupt vector is one of the unique interrupt vectors;

identify the quest-side interrupt vector and one of the plurality of operating systems that is an interrupt destination by accessing the respective I/O device to which the host-side interrupt vector included in the interrupt notification is allocated, based on the second vector information and the interrupt vector allocation information, in a case where the identified guest-side interrupt vector is one of the shared interrupt vectors, and send an interrupt notification including the identified quest-side interrupt vector to the identified one of the plurality of operating systems;

analyze a state of allocation of the host-side interrupt vectors to the guest-side interrupt vectors to select a shared interrupt vector to be processed out of the shared interrupt vectors, based on the rank information, and select a unique interrupt vector to be processed out of the unique interrupt vectors, based on the rank information, and change the allocation of the host-side interrupt vectors to the quest-side interrupt vectors based on a result of the analysis including to change the selected shared interrupt vector into the unique interrupt vector, and change the unique interrupt vector into the shared interrupt vector.

5. A method of managing an interrupt vector in a computer on which a plurality of operating systems run, the computer including, as physical resources:

a processor;

a volatile memory coupled to the processor;

a non-volatile memory coupled to the processor; and at least one I/O device coupled to the processor, the processor is configured to execute a virtualization function module configured to generate at least one virtual computer with the physical resources, and to manage the at least one virtual computer, one of the plurality of operating systems being configured to run on each of the at least one virtual computer, the one of the plurality of operating systems being configured to hold first vector information for managing a plurality of guest-side interrupt vectors that are set in order for the at least one I/O device to notify respective interrupts, and the at least one I/O device is allocated to one of the at least one virtual computer on which the one of the plurality of operating systems runs, the virtualization function module including an interrupt controller configured to hold:

second vector information for managing a plurality of host-side interrupt vectors that are set in order for the at least one I/O device to notify respective interrupts, interrupt vector allocation information for managing allocation of the host-side interrupt vectors to the guest-side interrupt vectors, and statistic information for separately managing an interrupt occurrence count for each of the guest-side interrupt vectors, and the guest-side interrupt vectors including unique interrupt vectors and shared interrupt vectors, each of the unique interrupt vectors being one of the guest-side interrupt vectors that is allocated one of the host-side interrupt vectors, each of the shared interrupt vectors being two or more of the guest-side interrupt vectors that share one of the host-side interrupt vectors, the interrupt vector management method comprising:

a first step of identifying, by the interrupt controller, a guest-side interrupt vector to which a host-side interrupt vector is allocated, based on the interrupt vector allocation information, in a case where an interrupt notification including the host-side interrupt vector is received;

a second step of sending, by the interrupt controller, an interrupt notification including the identified guest-side interrupt vector to one of the plurality of operating systems, based on the second vector information and the interrupt vector allocation information, in a case where the identified guest-side interrupt vector is one of the unique interrupt vectors;

a third step of identifying, by the interrupt controller, the guest-side interrupt vector and one of the plurality of operating systems that is an interrupt destination by accessing the respective I/O device to which the host-side interrupt vector included in the interrupt notification is allocated, based on the second vector information and the interrupt vector allocation information in a case where when the identified guest-side interrupt vector is one of the shared interrupt vectors, and sending an interrupt notification including the identified guest-side interrupt vector to the identified one of the plurality of operating systems;

a fourth step of analyzing, by the interrupt controller, a state of allocation of the host-side interrupt vectors to the guest-side interrupt vectors; and a fifth step of changing, by the interrupt controller, the allocation of the host-side interrupt vectors to the guest-side interrupt vectors based on a result of the analysis, wherein the fourth step includes a sixth step of selecting, based on the statistic information, a shared interrupt vector to be processed out of the shared interrupt vectors and a unique interrupt vector to be processed out of the unique interrupt vectors, and wherein the fifth step includes a seventh step of changing the selected shared interrupt vector into one of the unique interrupt vectors, and changing the selected unique interrupt vector into one of the shared interrupt vectors.

6. The interrupt vector management method according to claim 5, wherein the sixth step includes:

searching the plurality of shared interrupt vectors to find the shared interrupt vector that has a highest interrupt occurrence count; and searching the plurality of unique interrupt vectors to find the unique interrupt vector that has a lowest interrupt occurrence count, and wherein the seventh step includes:

changing a host-side interrupt vector that is allocated to the found shared interrupt vector to be allocated to the found unique interrupt vector; and changing the host-side interrupt vector that is allocated to the found unique interrupt vector to be allocated to the found shared interrupt vector.

7. The interrupt vector management method according to claim 5,
wherein the physical resources comprise a plurality of I/O devices,
wherein each of the plurality of I/O devices includes an interrupt cause register configured to store values that indicate causes of interrupts,
wherein the plurality of I/O devices include:
a plurality of first I/O devices in which the interrupt cause register keeps holding the values in a case where the virtualization function module accesses the interrupt cause register; and
a plurality of second I/O devices in which the values of the interrupt cause register are deleted in a case where the virtualization function module accesses the interrupt cause register,
wherein the interrupt vector management method further includes:
generating, by the interrupt controller, a first vector group, which is made up of the plurality of first I/O devices;
generating, by the interrupt controller, the statistic information for managing the interrupt occurrence counts of the guest-side interrupt vectors to which the host-side interrupt vectors that are respectively set to the plurality of first I/O devices included in the first vector group are allocated;
generating, by the interrupt controller, a second vector group, which is made up of one of the plurality of second I/O devices; and
generating, by the interrupt controller, the statistic information for managing the interrupt occurrence counts of the guest-side interrupt vectors to which the host-side interrupt vectors set to the one of the plurality of second I/O devices are allocated, and
wherein the fourth step includes:
selecting a vector group to be processed; and
selecting the shared interrupt vector to be processed and the unique interrupt vector to be processed by referring to the statistic information that is associated with the selected vector group.

* * * * *